(12) United States Patent
Miyakawa

(10) Patent No.: US 11,979,219 B2
(45) Date of Patent: May 7, 2024

(54) WIRELESS TRANSMISSION SYSTEM, WIRELESS TRANSMISSION DEVICE, WIRELESS TRANSMISSION METHOD, AND PROGRAM

(71) Applicant: NIPPON TELEGRAPH AND TELEPHONE CORPORATION, Tokyo (JP)

(72) Inventor: Kazu Miyakawa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 158 days.

(21) Appl. No.: 17/638,336

(22) PCT Filed: Aug. 27, 2019

(86) PCT No.: PCT/JP2019/033581
§ 371 (c)(1),
(2) Date: Feb. 25, 2022

(87) PCT Pub. No.: WO2021/038732
PCT Pub. Date: Mar. 4, 2021

(65) Prior Publication Data
US 2022/0294524 A1 Sep. 15, 2022

(51) Int. Cl.
*H04B 7/185* (2006.01)
*B64C 39/02* (2023.01)
(Continued)

(52) U.S. Cl.
CPC ....... *H04B 7/18504* (2013.01); *B64C 39/024* (2013.01); *G05D 1/0038* (2013.01);
(Continued)

(58) Field of Classification Search
None
See application file for complete search history.

(56) References Cited

U.S. PATENT DOCUMENTS

2018/0319495 A1* 11/2018 Tu .................. B64C 39/024

FOREIGN PATENT DOCUMENTS

| JP | 2018095049 A | * | 6/2018 |
| JP | 2018165099 A | * | 10/2018 |
| JP | 2018165099 A | | 10/2018 |

OTHER PUBLICATIONS

Japan DJI (2019) "Lightbridge 2" literature [online] Accessed on Aug. 19, 2019 (Reading Day), Website: https://www.dji.com/jp/lightbridge-2.

* cited by examiner

*Primary Examiner* — Heather R Jones

(57) ABSTRACT

A wireless transmission system (100) wirelessly transmits image information wirelessly transmitted by an image-capturing unmanned aerial vehicle (101), via a relay unmanned aerial vehicle (102, 103) operated by an operation controller (112, 113). The wireless transmission system (100) includes a reception status analysis unit (3) configured to analyze a reception status of the image information, a sensor information acquisition unit (4) configured to acquire information containing position information and altitude information of the relay unmanned aerial vehicle, a position computation unit (7) configured to compute a disposition position of the relay unmanned aerial vehicle at a third time point based on a first reception status and a first reception position of the image information at a first time point, and a second reception status and a second reception position of the image information at a second time point, a control information computation unit (8) configured to compute control information for moving the relay unmanned aerial vehicle from the first reception position to the disposition position, based on the disposition position, and an operation method display unit (12) configured to display an operation
(Continued)

method of the relay unmanned aerial vehicle based on the control information.

20 Claims, 6 Drawing Sheets

(51) Int. Cl.
*G05D 1/00* (2006.01)
*H04N 7/18* (2006.01)
*H04N 17/00* (2006.01)
*B64U 101/20* (2023.01)
*B64U 101/30* (2023.01)

(52) U.S. Cl.
CPC ........... *H04N 7/183* (2013.01); *H04N 17/004* (2013.01); *B64U 2101/20* (2023.01); *B64U 2101/30* (2023.01); *B64U 2201/20* (2023.01)

WIRELESS TRANSMISSION SYSTEM, WIRELESS TRANSMISSION DEVICE, WIRELESS TRANSMISSION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2019/033581, filed on 27 Aug. 2019, the disclosure of which is hereby incorporated herein by reference in its entirety.

TECHNICAL FIELD

The present disclosure relates to a wireless transmission system, a wireless transmission device, a wireless transmission method, and a program.

BACKGROUND ART

A manned aviation device with a large load capacity that can mount large commercial camera devices, and the like has been used to perform capturing images or videos. For example, an aircraft is used for aerial photography, and a helicopter is used for video broadcasting in a disaster area.

In recent years, with the large output of motors, the large capacity of batteries, and the development of the device control technology, unmanned aerial vehicles (UAV) having a size of about several kilograms are widely used, and image capturing with a small camera or the like has become common. The unmanned aerial vehicles have a feature making it easy to take pictures in various places because the unmanned aerial vehicles are small. Meanwhile, radio wave resources being public goods are used for the operation and the like of the unmanned aerial vehicles. Thus, the available frequency band, the output, and the like are strictly regulated.

The radio wave resources available for the unmanned aerial vehicles differ depending on the country. For example, in the case of Japan, a 73 MHz band or a 920 MHz band can be used for the operation, and a 2.4 GHz band can be used for image and information transmission. Due to the revision of the system in consideration of the use of the unmanned aerial vehicles, bands are increasing that are available for qualified special radio engineers. However, generally, the former wireless band which does not require the qualification is used in many cases.

The current main purpose of using the unmanned aerial vehicle is to capture an image or a video with a small camera or the like. In particular, the case of live-streaming the captured video on a broadcasting network or the Internet in real time can bring a new viewing experience with a sense of realism to the user with the ease of use of the unmanned aerial vehicle. Thus, in recent years, the unmanned aerial vehicles have been used in various fields.

Generally, video has a large amount of information. For example, in terrestrial digital broadcasting, an information flow rate of approximately 10 Mbps is obtained for a high vision video (the number of frame pixels is 1440×1080 pixels and the frame frequency is 29.97 Hz) using an MPEG2 format. In order to acquire such a high resolution video for broadcasting applications from the unmanned aerial vehicle, the band for the operation is not enough, and it is necessary to use the 2.4 GHz for the image and information transmission. However, because the 2.4 GHz band is used for various applications such as a public wireless LAN, for example, the decrease in throughput (amount of information transmission) due to radio wave interference easily occurs depending on the place. The output is also limited to suppress the radio wave interference, and the throughput tends to decrease with the decrease in distance.

Regarding such a problem, for example, in NPL 1, interference-free communication is realized by selecting the optimal channel and bandwidth based on the distance between the transmission side and the reception side or the radio wave environment.

CITATION LIST

Non Patent Literature

NPL 1: DJI JAPAN, "Lightbridge 2", [online], [Search on Aug. 19, 2019], Internet <URL: https://www.dji.com/jp/lightbridge-2>

SUMMARY OF THE INVENTION

Technical Problem

Even though the technology disclosed in NPL 1 is used, the distance between transmission and reception does not change, and thus drastic improvement of the radio wave condition is not achieved.

In view of such circumstances, an object of the present disclosure is to provide a wireless transmission system, a wireless transmission device, a wireless transmission method, and a program capable of stable wireless transmission.

Means for Solving the Problem

According to an embodiment, a wireless transmission system wirelessly transmits image information wirelessly transmitted by an image-capturing unmanned aerial vehicle via a relay unmanned aerial vehicle operated by an operation controller. The relay unmanned aerial vehicle includes a reception status analysis unit configured to analyze a reception status of the image information, a sensor information acquisition unit configured to acquire sensor information of the relay unmanned aerial vehicle, which contains position information and altitude information of the relay unmanned aerial vehicle, by using a sensor provided in the relay unmanned aerial vehicle, a position computation unit configured to compute a disposition position of the relay unmanned aerial vehicle at a third time point based on a first reception status and a first reception position of the image information at a first time point, and a second reception status and a second reception position of the image information at a second time point before the first time point, the third time point being after the first time point, and a control information computation unit configured to compute control information of the relay unmanned aerial vehicle based on the disposition position, the control information being used for moving the relay unmanned aerial vehicle from the first reception position to the disposition position. The operation controller includes an operation method display unit configured to display an operation method of the relay unmanned aerial vehicle based on the control information.

According to an embodiment, a wireless transmission device is operated by an operation controller to wirelessly transmit image information wirelessly transmitted by an image-capturing unmanned aerial vehicle. The wireless transmission device includes a reception status analysis unit configured to analyze a reception status of the image information, a sensor information acquisition unit configured to acquire sensor information of the wireless transmission device, which contains position information and altitude information of the wireless transmission device, by using a sensor provided in the wireless transmission device, a position computation unit configured to compute a disposition position of the wireless transmission device at a third time point based on a first reception status and a first reception position of the image information at a first time point, and a second reception status and a second reception position of the image information at a second time point before the first time point, the third time point being after the first time point, and a control information computation unit configured to compute control information of the wireless transmission device based on the disposition position, the control information being used for moving the wireless transmission device from the first reception position to the disposition position.

According to an embodiment, there is provided a wireless transmission method for wirelessly transmitting image information wirelessly transmitted by an image-capturing unmanned aerial vehicle via a relay unmanned aerial vehicle operated by an operation controller. The wireless transmission method includes analyzing a reception status of the image information, acquiring sensor information of the relay unmanned aerial vehicle, which contains position information and altitude information of the relay unmanned aerial vehicle, by using a sensor provided in the relay unmanned aerial vehicle, computing a disposition position of the relay unmanned aerial vehicle at a third time point based on a first reception status and a first reception position of the image information at a first time point, and a second reception status and a second reception position of the image information at a second time point before the first time point, the third time point being after the first time point, computing control information of the relay unmanned aerial vehicle based on the disposition position, the control information being used for moving the relay unmanned aerial vehicle from the first reception position to the disposition position, and displaying an operation method of the relay unmanned aerial vehicle based on the control information.

According to an embodiment, there is provided a program causing a computer to function as the wireless transmission device.

Effects of the Invention

According to the present disclosure, it is possible to provide a wireless transmission system, a wireless transmission device, a wireless transmission method, and a program capable of stable wireless transmission.

DESCRIPTION OF EMBODIMENTS

Hereinafter, embodiments for carrying out the present invention will be described with reference to the drawings.

Configuration of Wireless Transmission System

Figure 1:
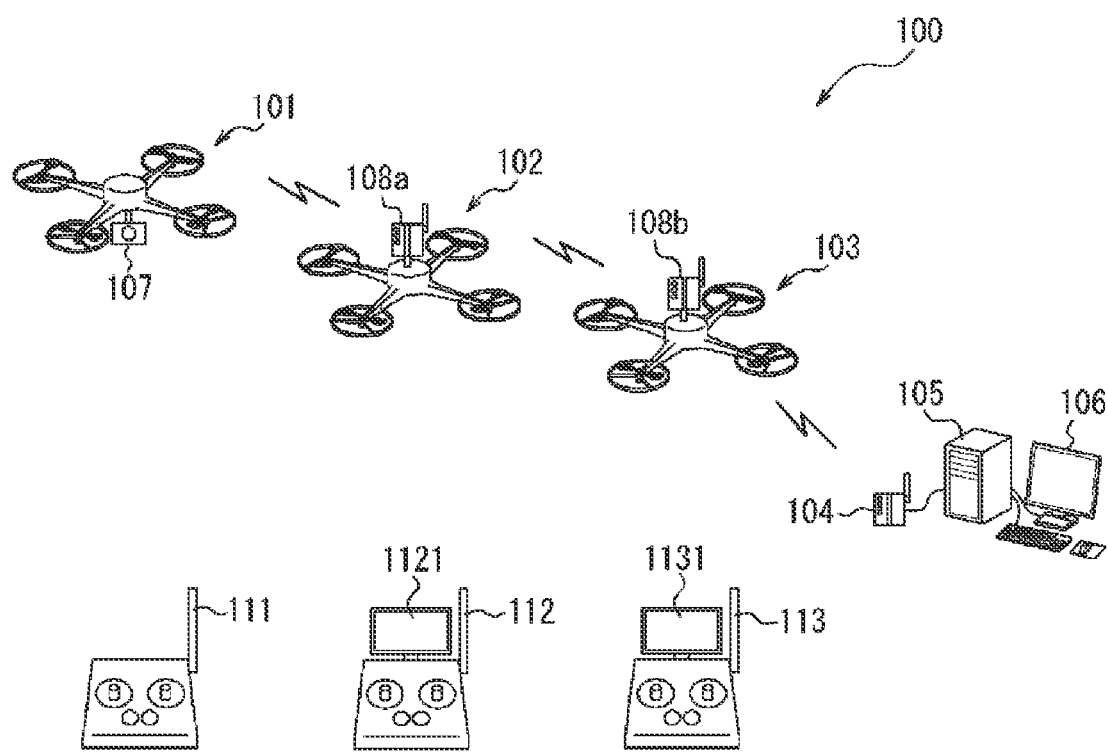
FIG. 1 is a diagram illustrating a configuration example of a wireless transmission system according to a first embodiment.

FIG. 1 is a diagram illustrating a configuration example of a wireless transmission system 100 according to a first embodiment of the present invention.

As illustrated in FIG. 1, the wireless transmission system 100 includes an image-capturing unmanned aerial vehicle 101, relay unmanned aerial vehicles (wireless transmission devices) 102 and 103, a wireless reception device 104, a computing device 105, a display device 106, and operation controllers 111, 112, and 113.

The image-capturing unmanned aerial vehicle 101 is a small unmanned aircraft having about several kilograms in weight. The image-capturing unmanned aerial vehicle 101 is operated by the operation controller 111 handled by an operator. The image-capturing unmanned aerial vehicle 101 mounts a camera 107 thereon to wirelessly transmit video data (image information) of a video captured by the camera 107 to the relay unmanned aerial vehicles 102 and 103. In the present embodiment, a case where one camera is mounted on the image-capturing unmanned aerial vehicle 101 will be described as an example. Two or more cameras may be mounted on the image-capturing unmanned aerial vehicle 101.

The relay unmanned aerial vehicles 102 and 103 are small unmanned aircraft having about several kilograms in weight. The relay unmanned aerial vehicles 102 and 103 are operated by the operation controllers 112 and 113 handled by the operator. The relay unmanned aerial vehicle 102 mounts a wireless relay 108$a$ thereon to relay the video data wirelessly received from the image-capturing unmanned aerial vehicle 101 and wirelessly transmit the video data to the relay unmanned aerial vehicle 103. The relay unmanned aerial vehicle 103 mounts a wireless relay 108$b$ thereon to relay the video data wirelessly received from the relay unmanned aerial vehicle 102 and wirelessly transmit the video data to the wireless reception device 104. In the present embodiment, a case in which the wireless transmission system 100 includes two relay unmanned aerial vehicles will be described as an example. The wireless transmission system 100 may include one relay unmanned aerial vehicle or may include three or more relay unmanned aerial vehicles.

The wireless reception device 104 receives video data of a video captured by the camera 107 mounted on the image-capturing unmanned aerial vehicle 101 in real time via wireless transmission from the relay unmanned aerial vehicle 103. Then, the wireless reception device outputs the received video data to the computing device 105. The wireless reception device 104 is a general wireless communication device having a function of receiving a wirelessly-transmitted signal.

The computing device 105 generates a video signal captured by the camera 107 mounted on the image-capturing unmanned aerial vehicle 101. The video signal is indicated by the video data received by the wireless reception device 104.

The display device 106 is a liquid crystal display, an organic EL display, an inorganic EL display, for example. The display device displays the video signal generated by the computing device 105.

The operation controller 111 is a controller handled by the operator when the operator operates the image-capturing unmanned aerial vehicle 101. The operation controller 112 or 113 is a controller handled by the operator when the operator operates the relay unmanned aerial vehicle 102 or 103. The operation controllers 112 and 113 mount auxiliary displays 1121 and 1131 such as a liquid crystal display, an organic EL display, and an inorganic EL display, for example.

Next, a configuration example of the relay unmanned aerial vehicle 102 and the operation controller 112 will be described with reference to FIG. 2. In the present embodiment, the configuration of the relay unmanned aerial vehicle 102 and the operation controller 112 will be described as an example. The similar description can be applied to the configuration of the relay unmanned aerial vehicle 103 and the operation controller 113.

Figure 2:
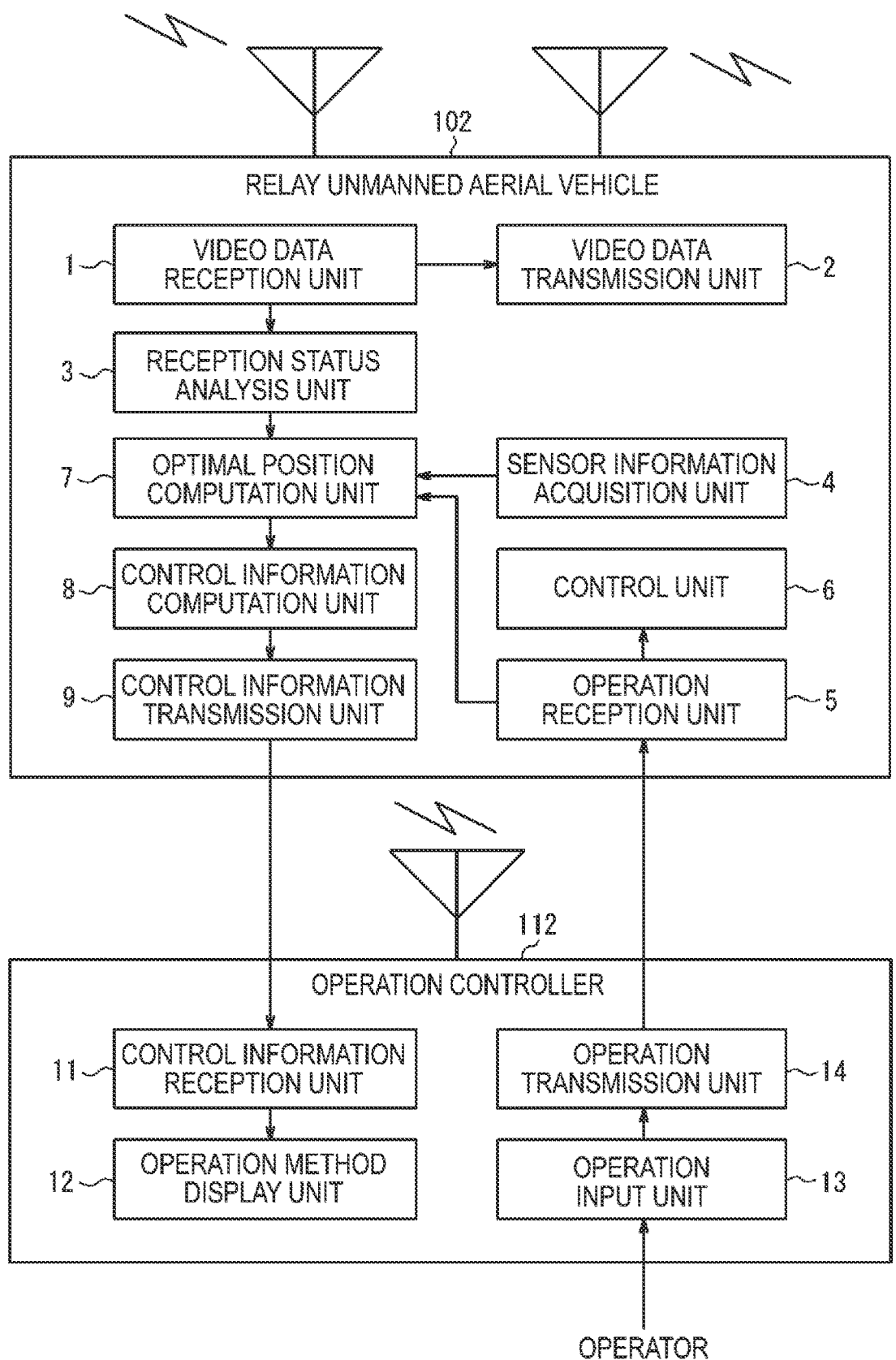
FIG. 2 is a block diagram illustrating the configuration example of the wireless transmission system according to the first embodiment.

As illustrated in FIG. 2, the relay unmanned aerial vehicle 102 includes a video data reception unit 1, a video data transmission unit 2, a reception status analysis unit 3, a sensor information acquisition unit 4, an operation reception unit 5, a control unit 6, an optimal position computation unit (position computation unit) 7, a control information computation unit 8, and a control information transmission unit 9.

The video data reception unit 1 wirelessly receives video data of a video captured by the camera 107 mounted on the image-capturing unmanned aerial vehicle 101, from the image-capturing unmanned aerial vehicle 101.

The video data transmission unit 2 relays the video data wirelessly received from the image-capturing unmanned aerial vehicle 101 and wirelessly transmits the video data to the relay unmanned aerial vehicle 103. For example, when a 2.4 GHz band is used, the video data transmission unit 2 may perform wireless transmission using a channel different from the channel of the video data which has been wirelessly received from the image-capturing unmanned aerial vehicle 101, in order to avoid radio wave interference.

The reception status analysis unit 3 analyzes the reception status of the video data wirelessly received by the video data reception unit 1. The reception status analysis unit 3 generates information regarding the reception status of the video data, for example, the amount of change in reception strength of the video data, the amount of change in throughput of the video data, and the like. Then, the reception status analysis unit outputs the generated information to the optimal position computation unit 7.

The sensor information acquisition unit 4 acquires sensor information by using various sensors provided in the relay unmanned aerial vehicle 102. The sensor information acquisition unit 4 acquires position information of the relay unmanned aerial vehicle 102 based on a global positioning system (GPS) signal, for example. The sensor information acquisition unit 4 acquires, for example, altitude information of the relay unmanned aerial vehicle 102 by using an altimeter provided in the relay unmanned aerial vehicle 102. The sensor information acquisition unit 4 outputs the acquired sensor information of the relay unmanned aerial vehicle 102 to the optimal position computation unit 7.

The operation reception unit 5 wirelessly receives operation information of the relay unmanned aerial vehicle 102 from the operation controller 112 handled by the operator. The operation information of the relay unmanned aerial vehicle 102 is information input to the operation controller 112 in order for the operator to operate the relay unmanned aerial vehicle 102. Examples of the operation information include information for operating the relay unmanned aerial vehicle 102 leftward and rightward, information for operating the relay unmanned aerial vehicle 102 forward and backward, and information for operating the relay unmanned aerial vehicle 102 upward and downward. The operation reception unit 5 outputs the operation information of the relay unmanned aerial vehicle 102 wirelessly received from the operation controller 112 handled by the operator, to the control unit 6 and the optimal position computation unit 7.

The control unit 6 controls, for example, a motor that rotates and drives a propeller provided on the relay unmanned aerial vehicle 102, based on the operation information of the relay unmanned aerial vehicle 102, which is input from the operation reception unit 5. Thus, the relay unmanned aerial vehicle 102 is operated based on the operation information, for example, moving to the left and right, advancing or retracting, and rising or descending.

The optimal position computation unit 7 determines the disposition position of the relay unmanned aerial vehicle 102, which causes the reception status of video data to be improved, based on the reception status of the video data input from the reception status analysis unit 3 and the sensor information of the relay unmanned aerial vehicle 102, which is input from the sensor information acquisition unit 4. For example, the optimal position computation unit 7 determines, as the disposition position, a position at which the reception strength of video data exceeds a first threshold value or has the maximum value, or a position at which the throughput of video data exceeds a second threshold value or has the maximum value. The optimal position computation unit 7 outputs the computed disposition position (optimal position) of the relay unmanned aerial vehicle 102 to the control information computation unit 8.

Specifically, the optimal position computation unit 7 computes difference values between a reception status (first reception status) and a reception position (first reception position) of video data at the current time point (first time point), and a reception status (second reception status) and a reception position (second reception position) of video data at a time point (second time point) before the current time point. The optimal position computation unit 7 computes the optimal position of the relay unmanned aerial vehicle 102 at a time point (third time point) after the current time point, based on the difference values. In other words, the optimal position computation unit 7 performs the following determination based on the difference values. The determination includes a determination of whether the relay unmanned aerial vehicle remains at the reception position of video data at the current time point, a determination of whether the relay unmanned aerial vehicle moves to the reception position of video data at the time point before the current time point, or a determination of whether the relay unmanned aerial vehicle moves to a new position which is different from both the reception position of the video data at the current time point and the reception position of the video data at the time point before the current time point. The optimal position computation unit 7 computes the optimal position of the relay unmanned aerial vehicle 102 at the time point after the current time point.

The optimal position computation unit 7 may compute the optimal position of the relay unmanned aerial vehicle 102 and a spatial displacement of the relay unmanned aerial vehicle 102 to the optimal position, based on the reception status of video data input from the reception status analysis unit 3, the sensor information of the relay unmanned aerial vehicle 102 input from the sensor information acquisition unit 4, and the operation information of the relay unmanned aerial vehicle 102 input from the operation reception unit 5.

Specifically, the optimal position computation unit 7 computes the following values based on the operation information of the relay unmanned aerial vehicle 102 at the current time point and the difference values between the reception status and the reception position of video data at the current time point, and the reception status and the reception position of video data at the time point before the current time point. The following values is the optimal position of the relay unmanned aerial vehicle 102 at the time point after the current time point, and the spatial displacement of the relay unmanned aerial vehicle 102 from the reception position of the video data at the current time point to the optimal position at the time point after the current time point. In other words, the optimal position computation unit 7 performs the following determination based on the difference values and the operation information of the relay unmanned aerial vehicle 102 at the current time point. The determination includes a determination of whether the relay unmanned aerial vehicle remains at the reception position of video data at the current time point, a determination of a direction to which the relay unmanned aerial vehicle 102 is to move and the amount of movement of the relay unmanned aerial vehicle when the relay unmanned aerial vehicle is to move to the reception position of video data at the time point before the current time point, or a determination of a direction to which the relay unmanned aerial vehicle 102 is to move and the amount of movement of the relay unmanned aerial vehicle when the relay unmanned aerial vehicle is to move to a new position different from both the reception position of video data at the current time and the reception position of video data at the time point before the current time point. The optimal position computation unit 7 computes the optimal position of the relay unmanned aerial vehicle 102 at the time point after the current time point, and the spatial displacement of the relay unmanned aerial vehicle 102 from the reception position of the video data at the current time point to the optimal position at the time point after the current time point.

In general, the relay unmanned aerial vehicle 102 constantly moves finely due to wind or fluctuations in motor control. Thus, it is difficult to stay at a predetermined position. As described above, the optimal position computation unit 7 computes the optimal position in consideration of not only the reception status of video data input from the reception status analysis unit 3 and the sensor information of the relay unmanned aerial vehicle 102 input from the sensor information acquisition unit 4, but also the operation information of the relay unmanned aerial vehicle 102. Thus, it is possible to compute the optimal position of the relay unmanned aerial vehicle 102 and the spatial displacement of the relay unmanned aerial vehicle 102 to the optimal position in consideration of information such as a direction or a distance in which the relay unmanned aerial vehicle 102 is intended to move from the current position. Thus, even though the relay unmanned aerial vehicle 102 constantly moves finely due to the wind or the fluctuations in motor control, it is possible to compute a position at which the reception status of video data wirelessly transmitted from the image-capturing unmanned aerial vehicle 101 is most improved, by the relay unmanned aerial vehicle 102.

The control information computation unit 8 computes the control information of the relay unmanned aerial vehicle 102, which is used for moving the relay unmanned aerial vehicle 102 from the reception position of video data at the current time point to the optimal position of the relay unmanned aerial vehicle 102 at the time point after the current time point. The control information computation unit computes the control information based on the optimal position of the relay unmanned aerial vehicle 102 at the time point after the current time point, which is input from the optimal position computation unit 7. The control information of the relay unmanned aerial vehicle 102 is information for moving the relay unmanned aerial vehicle 102 from one position to another position. For example, the control information of the relay unmanned aerial vehicle 102 includes information for moving the relay unmanned aerial vehicle 102 from the reception position of the video data at the current time point leftward by 5 cm, causing the relay unmanned aerial vehicle 102 to advance by 3 cm, or causing the relay unmanned aerial vehicle 102 to rise by 10 cm. The operator appropriately operates the relay unmanned aerial vehicle 102 based on the control information of the relay unmanned aerial vehicle 102 so that the relay unmanned aerial vehicle 102 moves to an appropriate position.

For example, when the determination result input from the optimal position computation unit 7 is that the relay unmanned aerial vehicle should maintain at the reception position of the video data at the current time point, the control information computation unit 8 computes control information of the relay unmanned aerial vehicle 102, which is used for causing the relay unmanned aerial vehicle 102 to stay at the reception position of the video data at the current time point, based on the determination result.

For example, when the determination result input from the optimal position computation unit 7 is that the relay unmanned aerial vehicle should move to the reception position of the video data at the time point before the current time point, the control information computation unit 8 computes the control information of the relay unmanned aerial vehicle 102, which is used for moving the relay unmanned aerial vehicle 102 from the reception position of the video data at the current time point leftward by 5 cm and upward by 3 cm, based on the determination result.

For example, when the determination result input from the optimal position computation unit 7 is that the relay unmanned aerial vehicle should move to a new reception position different from both the reception position of the video data at the current time point and the reception point of the video data at the time point before the current time point, the control information computation unit 8 computes the control information of the relay unmanned aerial vehicle 102, which is used for moving the relay unmanned aerial vehicle 102 from the reception position of the video data at the current time point downward by 6 cm and forward by 10 cm, based on the determination result.

The control information computation unit 8 outputs the computed control information of the relay unmanned aerial vehicle 102 to the control information transmission unit 9. The control information computation unit 8 may compute the control information of the relay unmanned aerial vehicle 102 so that the relay unmanned aerial vehicle 102 randomly and finely moves.

The control information transmission unit 9 wirelessly transmits the control information of the relay unmanned aerial vehicle 102 input from the control information computation unit 8, to the operation controller 112. For wireless transmission of the control information from the relay unmanned aerial vehicle 102 to the operation controller 112, a band different from the wireless transmission of video data from the relay unmanned aerial vehicle 102 to the relay unmanned aerial vehicle 103, for example, a 920 MHz band may be used.

As illustrated in FIG. 2, the operation controller 112 includes a control information reception unit 11, an operation method display unit 12, an operation input unit 13, and an operation transmission unit 14.

The control information reception unit 11 wirelessly receives the control information of the relay unmanned aerial vehicle 102 from the relay unmanned aerial vehicle 102. For example, control information reception unit 11 wirelessly receives the control information of the relay unmanned aerial vehicle 102, which is used for moving the relay unmanned aerial vehicle 102 from the reception position of the video data at the current time point leftward by 5 cm, causing the relay unmanned aerial vehicle 102 to advance by 3 cm, or causing the relay unmanned aerial vehicle 102 to rise by 10 cm. The control information reception unit 11 outputs the wirelessly-received control information of the relay unmanned aerial vehicle 102 to the operation method display unit 22.

The operation method display unit 12 is, for example, an auxiliary display 1121, and is mounted on the operation controller 112. The operation method display unit 12 displays an operation method of the relay unmanned aerial vehicle 102 for instructing the operator how to operate the relay unmanned aerial vehicle 102, based on the control information of the relay unmanned aerial vehicle 102, which is input from the control information reception unit 11.

For example, when the operation method display unit 12 displays, on the auxiliary display 1121, an upward arrow: movement distance of 3 cm, and a backward arrow: movement distance of 5 cm, the operator can intuitively recognize that the relay unmanned aerial vehicle 102 should be moved upward by 3 cm and moved backward by 5 cm. For example, when the operation method display unit 12 displays, on the auxiliary display 1121, a downward arrow: movement distance of 6 cm, and a forward arrow: movement distance of 10 cm, the operator can intuitively recognize that the relay unmanned aerial vehicle 102 should be moved downward by 6 cm and moved forward by 10 cm.

The operation input unit 13 receives an input from the operator. The operation input unit 13 outputs, to the operation transmission unit 24, the operation information of the relay unmanned aerial vehicle 102, which contains, for example, information for moving the relay unmanned aerial vehicle 102 leftward and rightward, information for causing the relay unmanned aerial vehicle 102 to advance or retract, and information for causing the relay unmanned aerial vehicle 102 to rise or descend, based on the input from the operator to the operation controller 112.

The operation transmission unit 24 wirelessly transmits the operation information input from the operation input unit 13 to the relay unmanned aerial vehicle 102.

As described above, the wireless transmission system 100 according to the first embodiment dynamically controls the positions of the relay unmanned aerial vehicles 102 and 103 by the operation controllers 112 and 113 based on the reception status, the reception position, and the like of video data, while relaying video data wirelessly transmitted from the image-capturing unmanned aerial vehicle 101 by the relay unmanned aerial vehicles 102 and 103. Thus, in the wireless transmission system 100 according to the first embodiment, the relay unmanned aerial vehicles 102 and 103 can be arranged at positions at which the reception status of video data is improved. This can suppress an influence of radio wave interference or output reduction, which enables stable wireless transmission.

Wireless Transmission Method Next, an example of a wireless transmission method according to the first embodiment of the present invention will be described with reference to FIG. 3.

In Step S1001, the video data reception unit 1 wirelessly receives video data of a video captured by the camera 107 mounted on the image-capturing unmanned aerial vehicle 101, from the image-capturing unmanned aerial vehicle 101.

In Step S1002, the reception status analysis unit 3 analyzes the reception status of the video data wirelessly received by the video data reception unit 1. The reception status analysis unit 3 generates information regarding the reception status, for example, the amount of change in reception strength of the video data, the amount of change in throughput of the video data, and the like.

In Step S1003, the sensor information acquisition unit 4 acquires sensor information by using various sensors provided in the relay unmanned aerial vehicle 102. The sensor information acquisition unit 4 acquires the position information of the relay unmanned aerial vehicle 102 based on a GPS signal, for example. The sensor information acquisition unit 4 acquires, for example, altitude information of the relay unmanned aerial vehicle 102 by using an altimeter provided in the relay unmanned aerial vehicle 102.

In Step S1004, the optimal position computation unit 7 computes difference values between a reception status and a reception position of video data at the current time point, and a reception status and a reception position of video data at a time point before the current time point. The optimal position computation unit 7 computes the optimal position of the relay unmanned aerial vehicle 102 at a time point after the current time point, based on the difference values.

In Step S1005, the control information computation unit 8 computes the control information of the relay unmanned aerial vehicle 102, which is used for moving the relay unmanned aerial vehicle 102 from the reception position of video data at the current time point to the optimal position of the relay unmanned aerial vehicle 102 at the time point after the current time point. The control information computation unit computes the control information based on the optimal position of the relay unmanned aerial vehicle 102 at the time point after the current time point.

In Step S1006, the operation method display unit 12 displays an operation method of the relay unmanned aerial vehicle 102 for instructing the operator how to operate the relay unmanned aerial vehicle 102, based on the control information of the relay unmanned aerial vehicle 102. By checking the operation method of the relay unmanned aerial vehicle 102 displayed in the operation method display unit 12, the operator can intuitively recognize the direction in which the relay unmanned aerial vehicle 102 should be moved, and the amount of movement.

The wireless transmission method according to the first embodiment is capable of reducing an influence of radio wave interference or output reduction, which enables stable wireless transmission.

Second Embodiment

Figure 6:
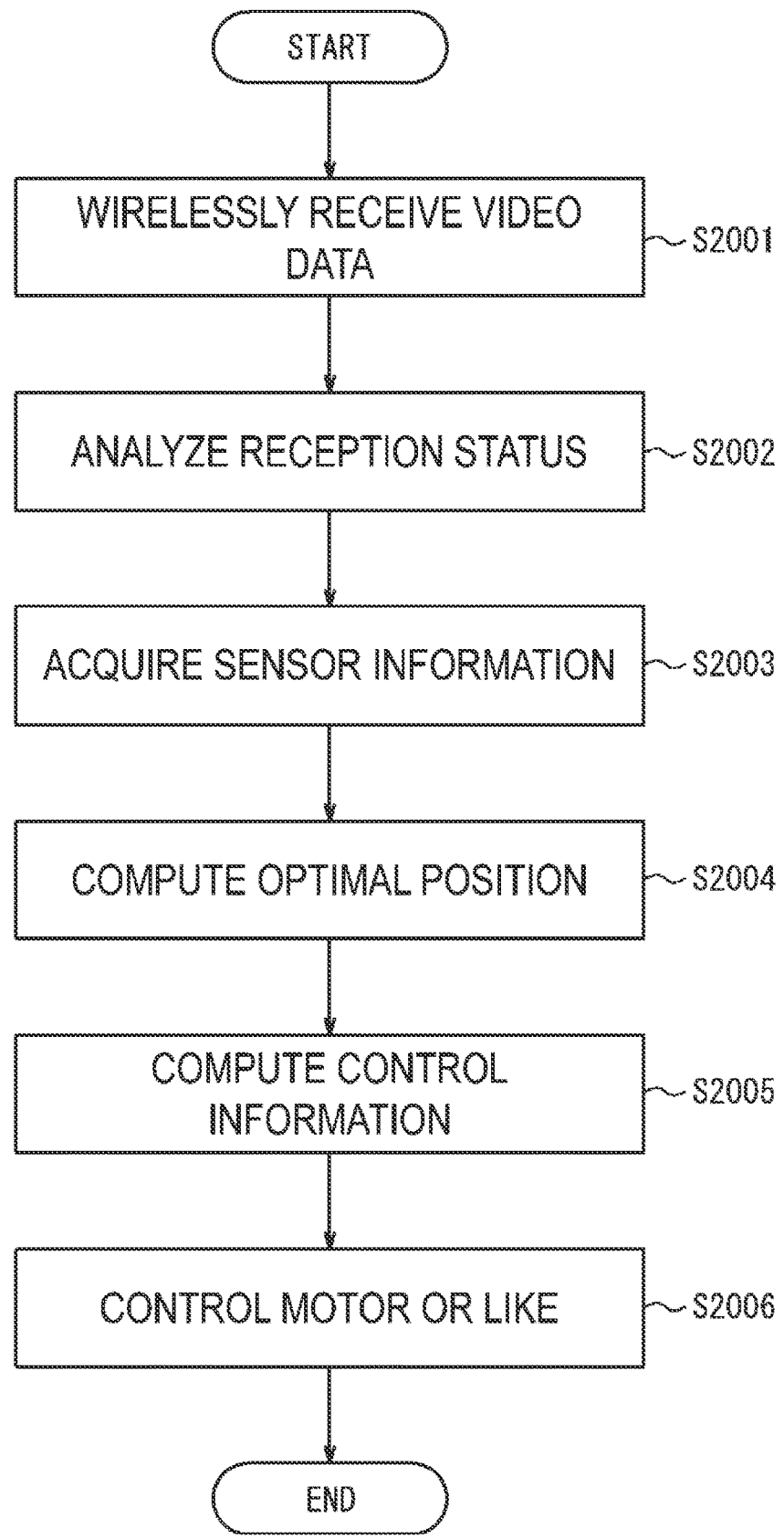
FIG. 6 is a flowchart illustrating an example of a wireless transmission method according to the second embodiment.

Next, a wireless transmission system 100A according to a second embodiment of the present invention will be described with reference to FIGS. 4 and 6.

The wireless transmission system 100A according to the second embodiment is different from the wireless transmission system 100 according to the first embodiment in that the positions of the relay unmanned aerial vehicles 102 and 103 are controlled by the operation information wirelessly transmitted from the operation controllers 112 and 113 in the wireless transmission system 100 according to the first embodiment, but, in the wireless transmission system 100A according to the second embodiment, relay unmanned aerial vehicles 102A and 103A autonomously perform position control. The other components are the same as those in the wireless transmission system 100 according to the first embodiment. Thus, in the present embodiment, only a configuration different from that of the wireless transmission system 100 according to the first embodiment will be described, and the same component as that of the wireless transmission system 100 according to the first embodiment will not be repeated.

Figure 4:
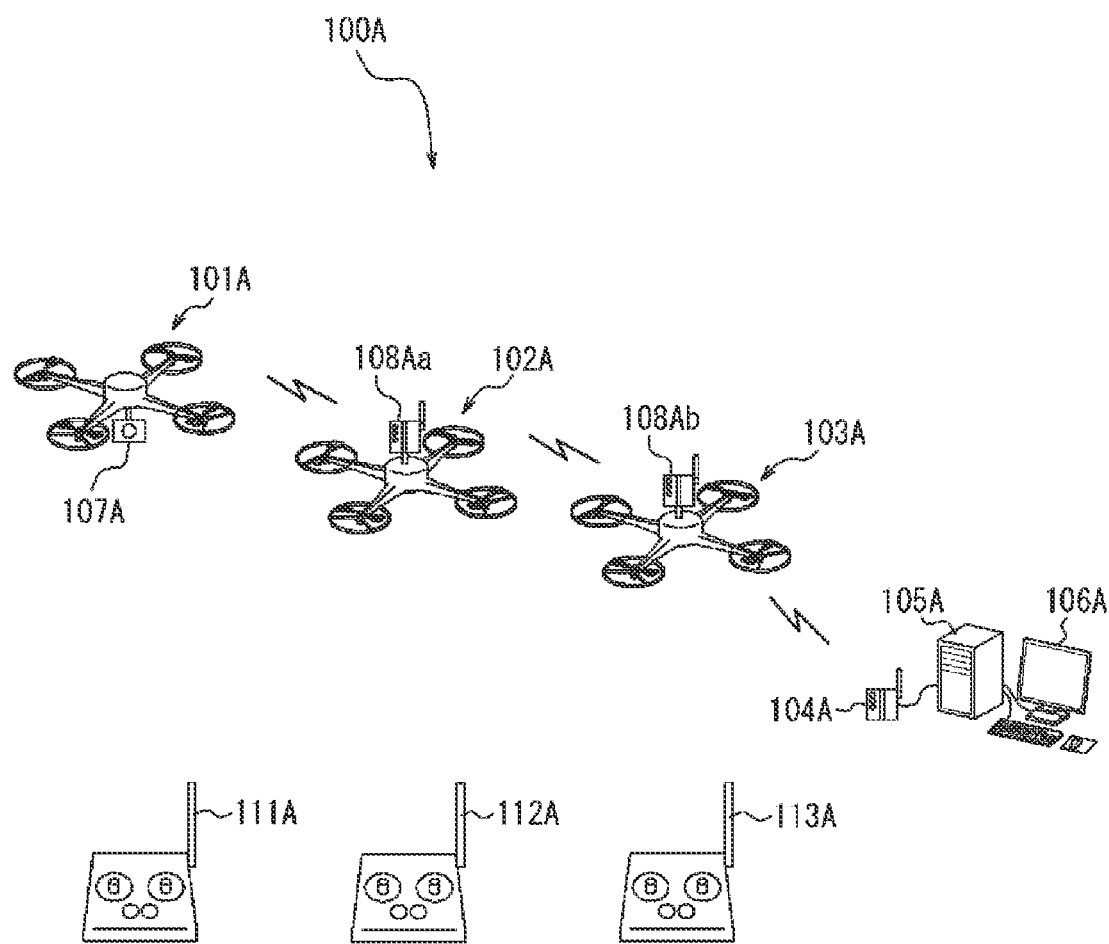
FIG. 4 is a diagram illustrating a configuration example of a wireless transmission system according to a second embodiment.

As illustrated in FIG. 4, the wireless transmission system 100A includes an image-capturing unmanned aerial vehicle 101A, relay unmanned aerial vehicles 102A and 103A, a wireless reception device 104A, a computing device 105A, a display device 106A, and operation controllers 111A, 112A, and 113A.

The operation controller 112A is a controller handled by the operator when the operator operates the relay unmanned aerial vehicle 102A. The operation controller 112A does not mount an auxiliary display thereon and is used to correct the position of the relay unmanned aerial vehicle 102A. For example, when the relay unmanned aerial vehicle 102A and the relay unmanned aerial vehicle 103A are too close to each other, the operator corrects the position of the relay unmanned aerial vehicle 102A with the operation controller 112A.

The operation controller 113A is a controller handled by the operator when the operator operates the relay unmanned aerial vehicle 103A. The operation controller 113A does not mount an auxiliary display thereon and is used to correct the position of the relay unmanned aerial vehicle 103A. For example, when the relay unmanned aerial vehicle 102A and the relay unmanned aerial vehicle 103A are too close to each other, the operator corrects the position of the relay unmanned aerial vehicle 103A with the operation controller 113A.

Figure 5:
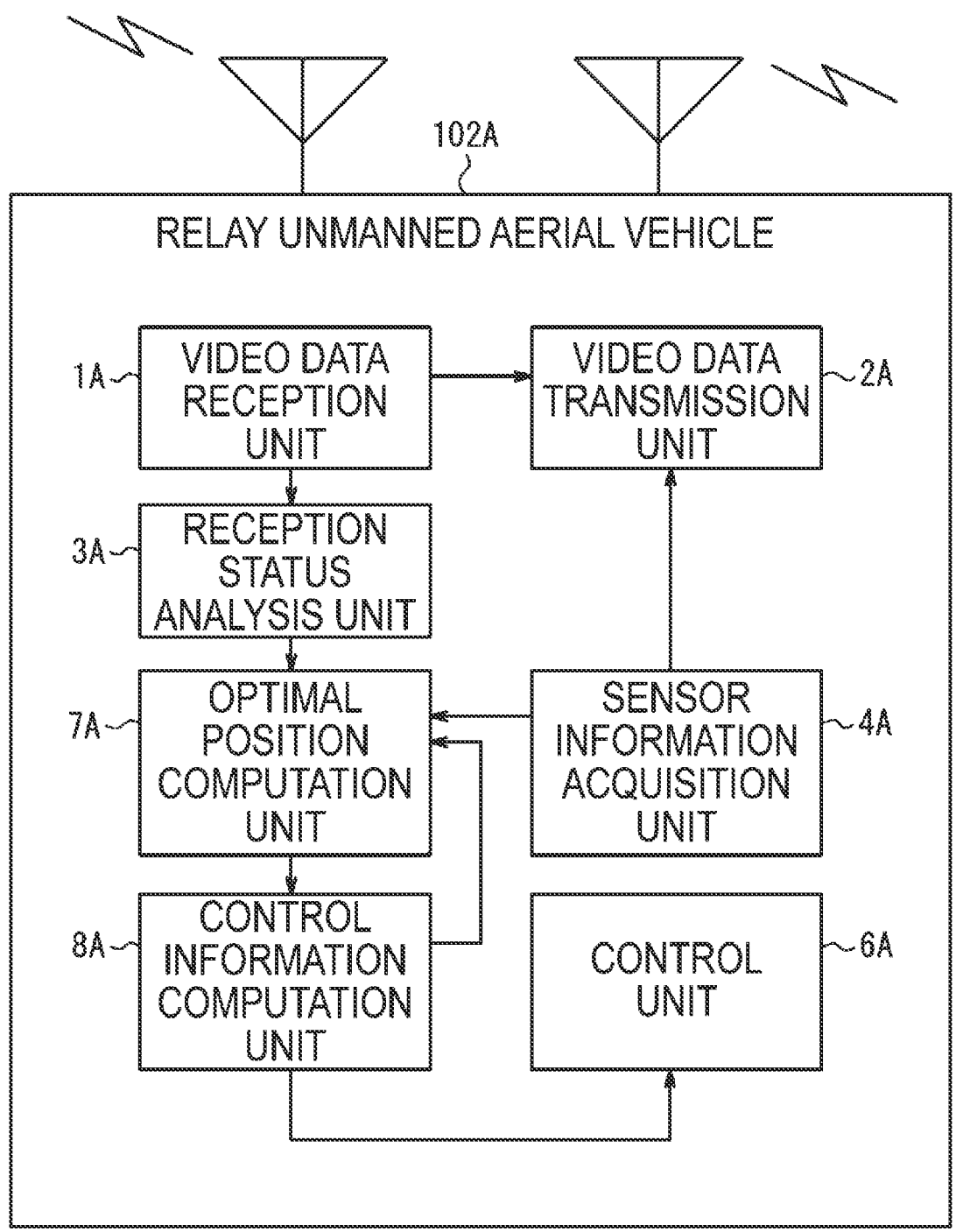
FIG. 5 is a block diagram illustrating the configuration example of the wireless transmission system according to the second embodiment.

As illustrated in FIG. 5, the relay unmanned aerial vehicle (wireless transmission device) 102A includes a video data reception unit 1A, a video data transmission unit 2A, a reception status analysis unit 3A, a sensor information acquisition unit 4A, a control unit 6A, an optimal position computation unit 7A, and a control information computation unit A8.

The video data reception unit 1A wirelessly receives video data of a video captured by a camera 107A mounted on the image-capturing unmanned aerial vehicle 101A, from the image-capturing unmanned aerial vehicle 101A.

The video data transmission unit 2A relays the video data wirelessly received from the image-capturing unmanned aerial vehicle 101A and wirelessly transmits the video data to the relay unmanned aerial vehicle 103A. The video data transmission unit 2A wirelessly transmits the sensor information of the relay unmanned aerial vehicle 102A input from the sensor information acquisition unit 4A, to the relay unmanned aerial vehicle 103A. The relay unmanned aerial vehicle 103A receives not only the video data but also the sensor information of the relay unmanned aerial vehicle 102A from the relay unmanned aerial vehicle 102A. Thus, it is possible to accurately recognize the position information, the altitude information, or the like of the relay unmanned aerial vehicle 102A. Thus, it is possible to suppress an occurrence of collision between the relay unmanned aerial vehicle 102A and the relay unmanned aerial vehicle 103A.

The sensor information acquisition unit 4A acquires sensor information by using various sensors provided in the relay unmanned aerial vehicle 102A. The sensor information acquisition unit 4A outputs the acquired sensor information of the relay unmanned aerial vehicle 102A to the video data transmission unit 2A and the optimal position computation unit 7A.

The optimal position computation unit 7A computes the optimal position of the relay unmanned aerial vehicle 102A based on the reception status of video data input from the reception status analysis unit 3A, the sensor information of the relay unmanned aerial vehicle 102A input from the sensor information acquisition unit 4A, and the control information of the relay unmanned aerial vehicle 102 fed back from the control information computation unit 8A. The optimal position computation unit 7A outputs the computed optimal position of the relay unmanned aerial vehicle 102A to the control information computation unit 8.

Specifically, the optimal position computation unit 7A computes the optimal position of the relay unmanned aerial vehicle 102A at a time point after the current time point, based on difference values between the reception status and the reception position of video data at the current time point, and the reception status and the reception position of video data at the time point before the current time point, and the control information of the relay unmanned aerial vehicle 102A, which is used for moving the relay unmanned aerial vehicle 102A from the reception position of video data at the time point before the current time point to the reception position of the video data at the current time point.

The control information computation unit 8A computes the control information of the relay unmanned aerial vehicle 102A, which is used for moving the relay unmanned aerial vehicle 102A from the reception position of video data at the current time point to the optimal position of the relay unmanned aerial vehicle 102A at the time point after the current time point. The control information computation unit computes the control information based on the optimal position of the relay unmanned aerial vehicle 102A at the time point after the current time point, which is input from the optimal position computation unit 7A. The control information computation unit 8A outputs the computed control information of the relay unmanned aerial vehicle 102A to the control unit 6A and the optimal position computation unit 7.

The control unit 6A controls, for example, a motor that rotates and drives a propeller provided on the relay unmanned aerial vehicle 102A, based on the control information of the relay unmanned aerial vehicle 102A, which is input from the control information computation unit 8A. Thus, the relay unmanned aerial vehicle 102 is subjected to the position control, for example, moving leftward or rightward by 5 cm, advancing or retracting by 3 cm, or rising or descending by 10 cm, based on the control information of the relay unmanned aerial vehicle 102A. In other words, the control unit 6A directly uses the control information of the relay unmanned aerial vehicle 102A computed by the control information computation unit 8A for the position control of the relay unmanned aerial vehicle 102A without using the operation controller 112A. Thus, the relay unmanned aerial vehicle 102A can autonomously perform the position control.

According to the wireless transmission system 100A according to the second embodiment, the positions of the relay unmanned aerial vehicles 102 and 103 are autonomously controlled based on the reception status and the reception position of video data, the control information of the relay unmanned aerial vehicles 102A and 103A, and the like, while video data wirelessly transmitted from the image-capturing unmanned aerial vehicle 101A is relayed by the relay unmanned aerial vehicles 102A and 103A. Thus, in the wireless transmission system 100A according to the second embodiment, it is possible to arrange the relay unmanned aerial vehicles 102 and 103 at positions at which the reception status of video data is improved. This can suppress an influence of radio wave interference or output reduction, which enables stable wireless transmission.

Wireless Transmission Method

Next, an example of a wireless transmission method according to the second embodiment of the present invention will be described with reference to FIG. 6.

In Step S2001, the video data reception unit 1A wirelessly receives video data of a video captured by the camera 107A mounted on the image-capturing unmanned aerial vehicle 101A, from the image-capturing unmanned aerial vehicle 101A.

In Step S2002, the reception status analysis unit 3A analyzes the reception status of the video data wirelessly received by the video data reception unit 1A. The reception status analysis unit 3A generates information regarding the reception status, for example, the amount of change in reception strength of the video data, the amount of change in throughput of the video data, and the like.

In Step S2003, the sensor information acquisition unit 4A acquires sensor information by using various sensors provided in the relay unmanned aerial vehicle 102A. The sensor information acquisition unit 4A acquires the position information of the relay unmanned aerial vehicle 102A based on a GPS signal, for example. The sensor information acquisition unit 4 acquires, for example, altitude information of the relay unmanned aerial vehicle 102A by using an altimeter provided in the relay unmanned aerial vehicle 102A.

In Step S2004, the optimal position computation unit 7 computes the optimal position of the relay unmanned aerial vehicle 102A at the time point after the current time point based on the control information of the relay unmanned aerial vehicle 102A and the difference values between the reception status and the reception position of video data at the current time point, and the reception status and the reception position of video data at the time point before the current time point.

In Step S2005, the control information computation unit 8A computes the control information of the relay unmanned aerial vehicle 102A, which is used for moving the relay unmanned aerial vehicle 102A from the reception position of video data at the current time point to the optimal position of the relay unmanned aerial vehicle 102 at the time point after the current time point, based on the optimal position of the relay unmanned aerial vehicle 102A at the time point after the current time point.

In Step S2006, the control unit 6A controls, for example, the motor that rotates and drives the propeller provided on the relay unmanned aerial vehicle 102A, based on the control information of the relay unmanned aerial vehicle 102A, which is used for moving the relay unmanned aerial vehicle 102A from the reception position of video data at the current time point to the optimal position of the relay unmanned aerial vehicle 102 at the time point after the current time point.

The wireless transmission method according to the second embodiment is capable of suppressing an influence of radio wave interference or output reduction, which enables stable wireless transmission.

Modifications

In the present embodiment, the case in which the wireless transmission system 100 or 100A is applied to applications for wirelessly transmitting video data of a video captured by the camera 107 mounted on the image-capturing unmanned aerial vehicle 101 has been described as an example, but the applications of the wireless transmission system 100 or 100A are not limited thereto. For example, the wireless transmission system 100 or 100A may be applied to applications for wirelessly transmitting operation information for controlling flying of an unmanned aerial vehicle in a remote location. For example, the wireless transmission system 100 or 100A may be applied to applications for simultaneously relaying video data duplicated in the relay unmanned aerial vehicle to a plurality of sites.

Program and Recording Medium

It is possible to use a computer capable of executing program commands to function as the above-described embodiments and modifications. The computer can be implemented in a manner that a program describing the processing contents for realizing the functions of the devices is stored in a storage unit of the computer, and the program is read and executed by a processor of the computer. At least a portion of the processing contents may be realized by hardware. Here, the computer may be a general-purpose computer, a special purpose computer, a workstation, a personal computer (PC), an electronic notepad, or the like. The program commands may be program codes, code segments, or the like for executing a necessary task. The processor may be a central processing unit (CPU), a graphics processing unit (GPU), a digital signal processor (DSP), an application specific integrated circuit (ASIC), or the like.

Figure 3:
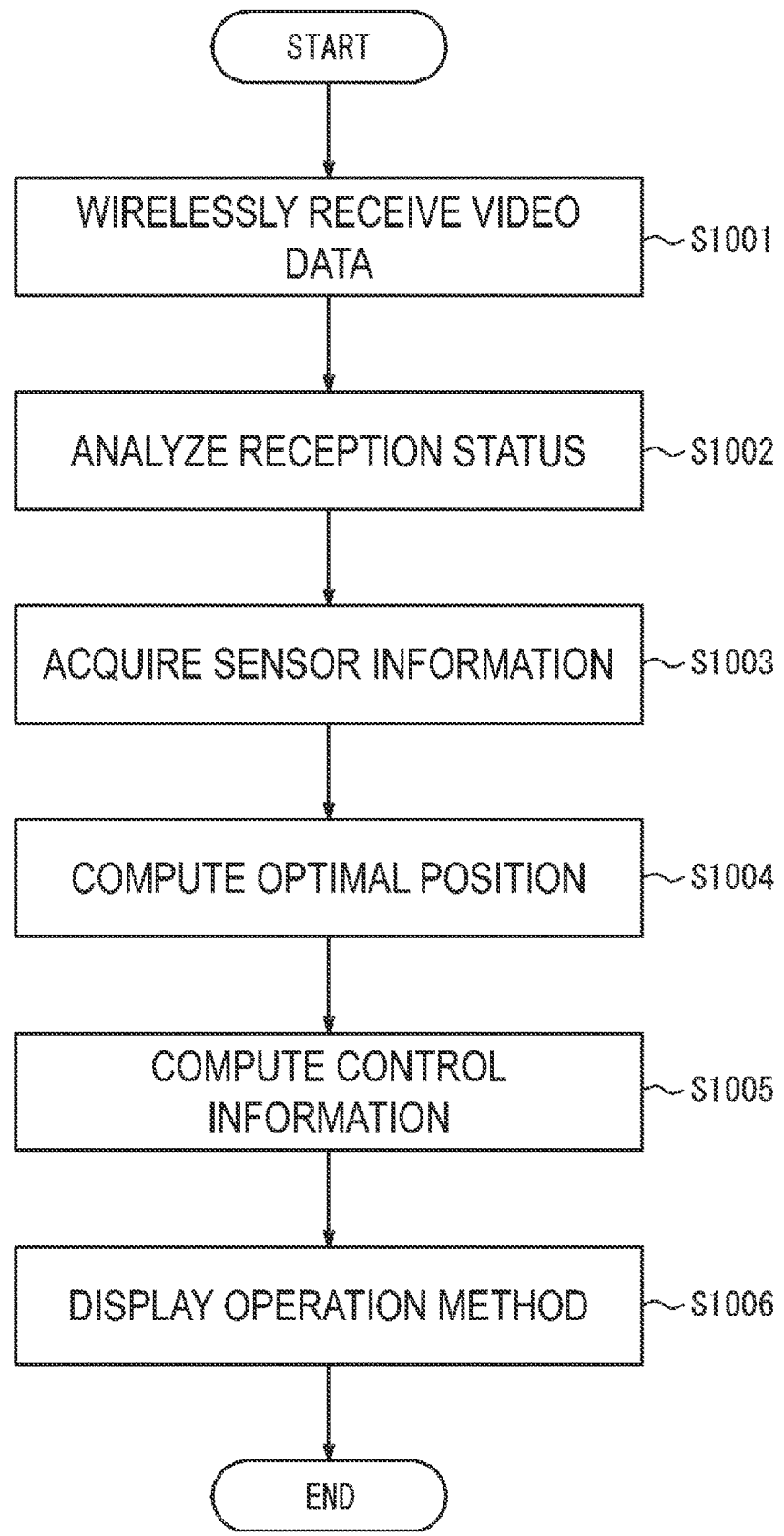
FIG. 3 is a flowchart illustrating an example of a wireless transmission method according to the first embodiment.

For example, referring to FIG. 3, a program causing the computer to perform the above-described estimation method includes Steps S1001 and S1002 of analyzing a reception status of image information wirelessly transmitted by the image-capturing unmanned aerial vehicle 101, Step S1003 of acquiring sensor information of the relay unmanned aerial vehicle 102, which contains position information and altitude information of the relay unmanned aerial vehicle 102, by using the sensor provided in the relay unmanned aerial vehicle 102 operated by the operation controller 112, Step S1004 of computing a disposition position of the relay unmanned aerial vehicle 102 at a third time point based on a first reception status and a first reception position of the image information at a first time point, and a second reception status and a second reception position of the image information at a second time point before the first time point, the third time point being after the first time point, Step S1005 of computing control information of the relay unmanned aerial vehicle 102, which is used for moving the relay unmanned aerial vehicle 102 from the first reception position to the disposition position, based on the disposition position, and Step S1006 of displaying an operation method of the relay unmanned aerial vehicle 102 based on the control information.

The program may be recorded on a computer-readable recording medium. Such a computer-readable medium can be used to install the program on a computer. Here, the recording medium on which the program is recorded may be a non-transient recording medium. The non-transient recording medium may be a CD (compact disk)-ROM (Read-Only Memory), a DVD (digital versatile disc)-ROM, a BD (Bluray (trade name) disc)-ROM, and the like. The program may also be provided by being downloaded via a network.

The above embodiments have been described as a representative example, but it is apparent to those skilled in the art that many changes and substitutions are possible within the spirit and scope of the present disclosure. Therefore, the present invention should not be construed as being limited by the embodiment described above, and various modifications and changes can be made without departing from the scope of the claims. For example, a plurality of constituent blocks described in the configuration diagrams of the embodiments can be combined into one or one constituent block can be divided. Combination of a plurality of processes illustrated in the flowchart of the embodiments or division of one process can be made.

REFERENCE SIGNS LIST

1 Video data reception unit
2, 2A Video data transmission unit
3 Reception status analysis unit
4, 4A Sensor information acquisition unit
5 Operation reception unit
6, 6A Control unit
7 Optimal position computation unit (position computation unit)
8, 8A Control information computation unit
9 Control information transmission unit
11 Control information reception unit
12 Operation method display unit
13 Operation input unit
14 Operation transmission unit
100, 100A Wireless transmission system
101, 101A Image-capturing unmanned aerial vehicle
102, 102A Relay unmanned aerial vehicle (wireless transmission device)
103, 103A Relay unmanned aerial vehicle (wireless transmission device)
104, 104A Wireless reception device
105, 105A Computing device
106, 106A Display device
111, 111A Operation controller
112, 112A Operation controller
113, 113A Operation controller
1121, 1131 Auxiliary display

The invention claimed is:

1. A wireless transmission system for wirelessly transmitting image information wirelessly transmitted by an image-capturing unmanned aerial vehicle via a relay unmanned aerial vehicle operated by an operation controller, wherein the relay unmanned aerial vehicle is configured to:
analyze a reception status of the image information;
acquire sensor information of the relay unmanned aerial vehicle, which contains position information and altitude information of the relay unmanned aerial vehicle, by using a sensor provided in the relay unmanned aerial vehicle;
compute a disposition position of the relay unmanned aerial vehicle at a third time point based on a first reception status and a first reception position of the image information at a first time point, and a second reception status and a second reception position of the image information at a second time point before the first time point, the third time point being after the first time point;
compute control information of the relay unmanned aerial vehicle based on the disposition position, the control information being used for moving the relay unmanned aerial vehicle from the first reception position to the disposition position; and
display an operation method of the relay unmanned aerial vehicle based on the control information.

2. The wireless transmission system according to claim 1, wherein the relay unmanned aerial vehicle is further configured to:
wirelessly receive operation information of the relay unmanned aerial vehicle from the operation controller; and
compute the disposition position and a spatial displacement from the first reception position to the disposition position based on the first reception status, the first reception position, the second reception status, the second reception position, and the operation information at the first time point.

3. The wireless transmission system according to claim 1, wherein computing a disposition position further comprises determining at least one of a position at which reception strength of video data exceeds a first threshold value or a position at which throughput of the video data exceeds a second threshold value, as the disposition position.

4. The wireless transmission system according to claim 1, wherein the relay unmanned aerial vehicle is further configured to move to the disposition position based on the control information.

5. The wireless transmission system according to claim 1, wherein displaying an operation method comprised displaying a direction and an associated moving distance.

6. The wireless transmission system according to claim 1, wherein the sensor comprises at least one of:
a GPS unit; or
an altimeter.

7. A wireless transmission method for wirelessly transmitting image information wirelessly transmitted by an image-capturing unmanned aerial vehicle via a relay unmanned aerial vehicle operated by an operation controller, the method comprising:
analyzing a reception status of the image information;
acquiring sensor information of the relay unmanned aerial vehicle, which contains position information and altitude information of the relay unmanned aerial vehicle, by using a sensor provided in the relay unmanned aerial vehicle;
computing a disposition position of the relay unmanned aerial vehicle at a third time point based on a first reception status and a first reception position of the image information at a first time point, and a second reception status and a second reception position of the image information at a second time point before the first time point, the third time point being after the first time point;
computing control information of the relay unmanned aerial vehicle based on the disposition position, the control information being used for moving the relay unmanned aerial vehicle from the first reception position to the disposition position; and
displaying an operation method of the relay unmanned aerial vehicle based on the control information.

8. The wireless transmission method of claim 7, the method further comprising moving the relay unmanned aerial vehicle to the disposition position based on the control information.

9. The wireless transmission method of claim 7, further comprising generating information regarding the reception status, wherein the information regarding the reception status comprises at least one of:
- a change in reception strength of the image information; or
- a change in throughput of the image information.

10. The wireless transmission method of claim 7, wherein the sensor comprises at least one of:
- a GPS unit; or
- an altimeter.

11. The wireless transmission method of claim 7, further comprising wireless transmitting the control information to an operation controller.

12. The wireless transmission method of claim 11, wherein the control information is transmitted over a first wireless band and the image information is transmitted over a second wireless band, the first wireless band different from a second wireless band.

13. The wireless transmission method of claim 7, wherein displaying an operation method comprised displaying a direction and an associated moving distance.

14. A non-transitory computer-readable medium comprising computer executable instruction that, when executed by at least one processor, performs a method comprising:
- analyzing a reception status of the image information;
- acquiring sensor information of the relay unmanned aerial vehicle, which contains position information and altitude information of the relay unmanned aerial vehicle, by using a sensor provided in the relay unmanned aerial vehicle;
- computing a disposition position of the relay unmanned aerial vehicle at a third time point based on a first reception status and a first reception position of the image information at a first time point, and a second reception status and a second reception position of the image information at a second time point before the first time point, the third time point being after the first time point;
- computing control information of the relay unmanned aerial vehicle based on the disposition position, the control information being used for moving the relay unmanned aerial vehicle from the first reception position to the disposition position; and
- displaying an operation method of the relay unmanned aerial vehicle based on the control information.

15. The non-transitory computer-readable medium of claim 14, wherein the method further comprises moving the relay unmanned aerial vehicle to the disposition position based on the control information.

16. The non-transitory computer-readable medium of claim 14, wherein the method further comprises generating information regarding the reception status, wherein the information regarding the reception status comprises at least one of:
- a change in reception strength of the image information; or
- a change in throughput of the image information.

17. The non-transitory computer-readable medium of claim 14, wherein the sensor comprises at least one of:
- a GPS unit; or
- an altimeter.

18. The non-transitory computer-readable medium of claim 14, wherein the method further comprises wireless transmitting the control information to an operation controller.

19. The non-transitory computer-readable medium of claim 18, wherein the control information is transmitted over a first wireless band and the image information is transmitted over a second wireless band, the first wireless band different from a second wireless band.

20. The non-transitory computer-readable medium of claim 14, wherein displaying an operation method comprises displaying a direction and an associated moving distance.

* * * * *